C. H. DE LA MONTE & E. A. HENKLE.
SPEED RECORDER.
APPLICATION FILED MAY 2, 1908.

914,850.

Patented Mar. 9, 1909.
3 SHEETS—SHEET 1.

Witnesses.
Robert Emmitt.

Inventors.
Cascious H. de La Monte.
Edward A. Henkle.
By James L. Norris
Atty.

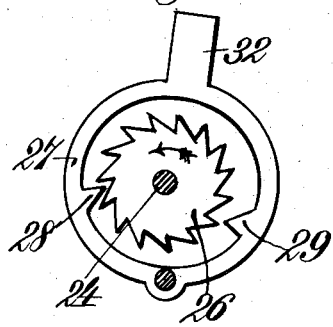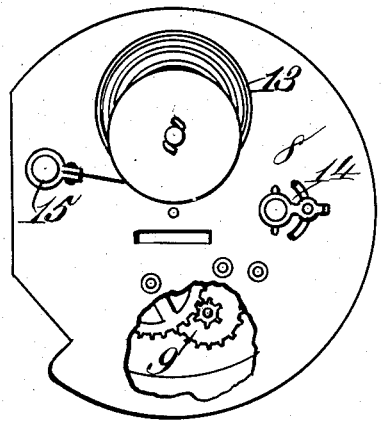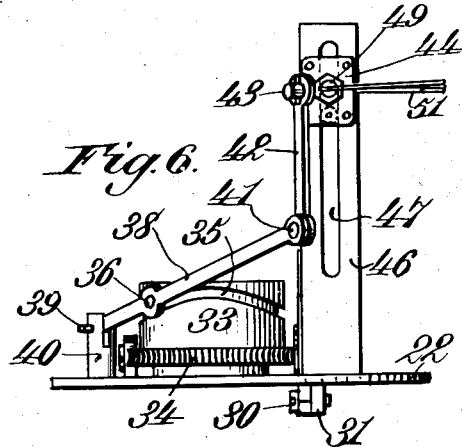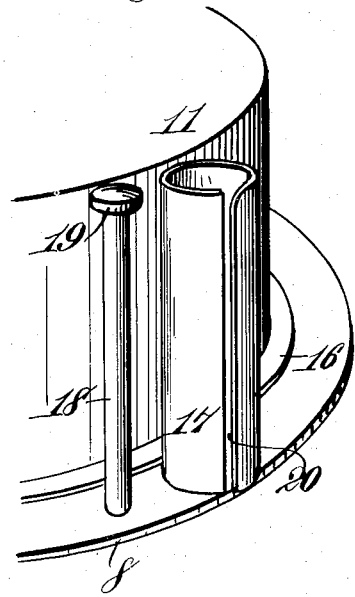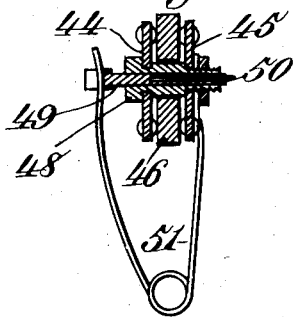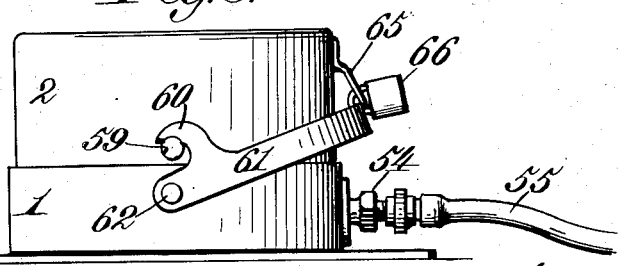

C. H. DE LA MONTE & E. A. HENKLE.
SPEED RECORDER.
APPLICATION FILED MAY 2, 1908.
914,850.
Patented Mar. 9, 1909.
3 SHEETS—SHEET 3.
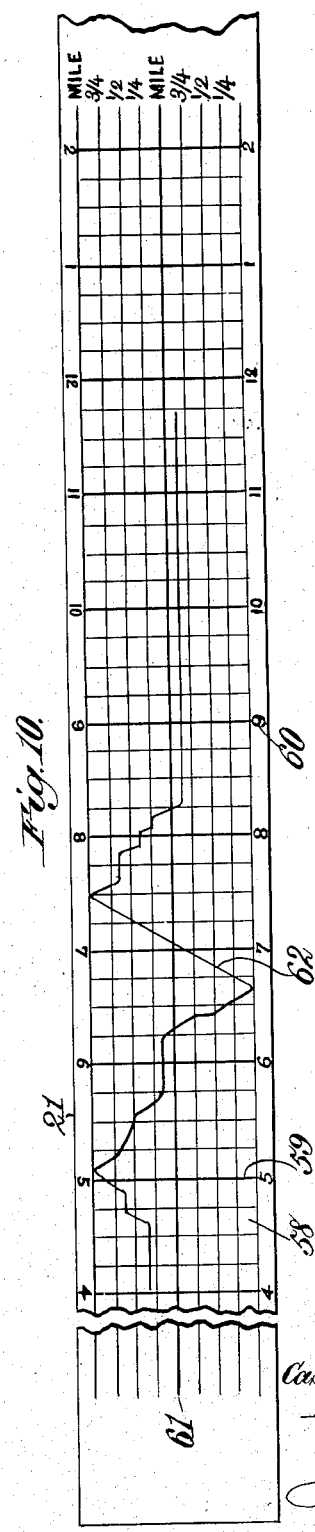
Witnesses.
Inventors.
Cascious H. de La Monte.
Edward A. Henkle.
By
James L. Norris
Atty.

UNITED STATES PATENT OFFICE.

CASCIOUS H. DE LA MONTE AND EDWARD A. HENKLE, OF PHILADELPHIA, PENNSYLVANIA, ASSIGNORS TO INTERNATIONAL SPEED REGISTER CO., OF NEW YORK, N. Y., A CORPORATION OF NEW YORK.

SPEED-RECORDER.

No. 914,850.

Specification of Letters Patent.

Patented March 9, 1909.

Application filed May 2, 1908. Serial No. 430,545.

*To all whom it may concern:*

Be it known that we, CASCIOUS H. DE LA MONTE, a citizen of the Republic of Mexico, and EDWARD A. HENKLE, a citizen of the United States, residing at Philadelphia, in the county of Philadelphia and State of Pennsylvania, have invented new and useful Improvements in Speed-Recorders, of which the following is a specification.

This invention relates to speed recorders particularly adapted for use in connection with vehicles and for other purposes wherein it is found applicable.

One of the objects of the invention is to provide a speed recording instrument in a manner as hereinafter set forth for not only recording the speed of travel and the distances traveled, but also the time consumed in stoppages, all of which is very valuable as a detector to indicate the working time of the driver of the vehicle to determine the number of miles the vehicle has traveled and the rates of speed at which the vehicle has been driven, whether fast or slow.

A further object of the invention is to provide an instrument of the class referred to with a fluid pressure actuated means for operating the marker mechanism during the travel of the vehicle, said fluid pressure actuated means being operated from a moving part of the vehicle and thereby is unusually efficient in use.

With the foregoing and other objects in view, the invention aims to provide a combined speed, distance and time recorder, as termed generically, a speed recording instrument, which shall be simple in its construction, strong, durable, operating in an accurate manner, efficient in its use, of small compass, readily set up in operative position and comparatively inexpensive to manufacture.

With the foregoing and other objects in view, the invention consists of the novel construction, combination and arrangement of parts hereinafter more specifically described and illustrated in the accompanying drawings, wherein is shown the preferred embodiment of the invention, but it is understood that changes, variations and modifications can be resorted to which come within the scope of the claims hereunto appended.

Figure 1:
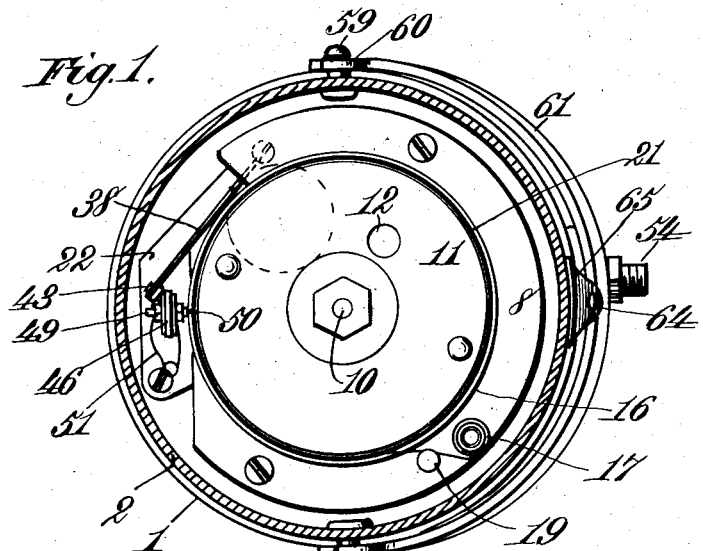
Figure 2:
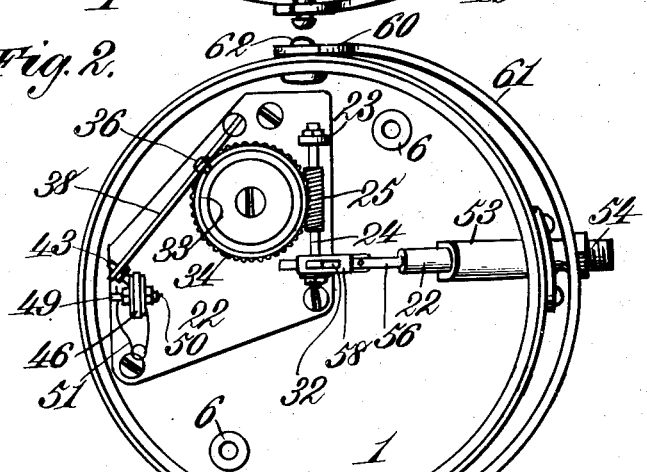
Figure 3:
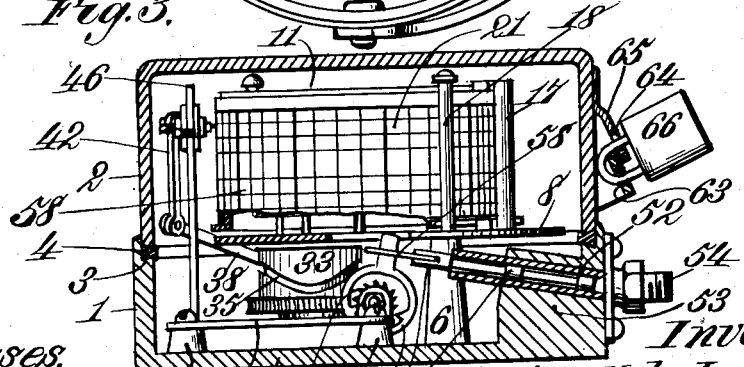

In the drawings wherein like reference characters denote corresponding parts throughout the several views:—Figure 1 is a sectional plan of a speed recorder in accordance with this invention. Fig. 2 is a top plan showing the actuating means for the marker mechanism. Fig. 3 is a sectional elevation. Fig. 4 is a detail showing the intermittently operated impulse member for the operating means for the marker. Fig. 5 is an inverted plan broken away illustrating the clock train or motor mechansim. Fig. 6 is an elevation showing the operating means and marker. Fig. 7 is a view of a portion of the carrier, showing the recorder strip and tensioning bar for the strip. Fig. 8 is a vertical sectional view illustrating the supporting mechanism for the marker. Fig. 9 is a side elevation of the casing for the mechanism. Fig. 10 is a view of a portion of the record tape showing a diagram made by the recorder.

Referring to the drawings by reference characters, the casing in which the mechanism is inclosed is formed of a body portion 1 and a cover 2. The top edge of the body portion 1 is cut away to provide a seat 3 upon which is mounted a resilient packing or washer 4 against which abuts the lower edge of the cover 2, whereby when the cover is secured to the body portion a seal is provided.

Projecting upwardly from the bottom 5 of the body portion 1 are the supporting posts 6 and the supporting posts 7, these latter being of less height than the former and to the posts 6 is fixedly secured a base or a supporting or pivoting plate 8 upon which is mounted a clock train or motor mechanism 9 which is so geared as to cause the main staff 10 thereof to revolve at a predetermined rate, say by way of example one revolution every twelve hours. To the staff 10 is attached a drum 11 constituting a record tape carrier, the carrier rotating with the staff 10 and provided with an opening 12 so that access can be had to wind the clock train or motor mechanism to wind the power transmitting spring 13 (Fig. 5). The regulator is indicated by the reference character 14. One end of the power spring is shown fixed to a stud 15, Fig. 5. The carrier 11 incloses the clock train or motor mechanism 9 and is of such diameter with respect to the plate 8 that the latter will project from the carrier, forming thereby what may be termed a supporting ledge 16 for the record tape holder 17 and the record tape tensioning bar 18, the latter being provided with a head 19. The holder 17 as well as the bar 18 are vertically disposed and arranged in close proximity to the carrier 11. The tape holder 17 is substantially cylindrical in contour and is provided with a vertically extending slit 20 through which the record tape 21 passes as the latter is wound upon the drum 11. The tape 21 as it leaves the holder 17 passes between the bar 18 and the drum, whereby tension is placed upon the tape 21 and it is held in snug contact with the carrier 11. The head 19 prevents the vertical or upward movement of the tape 21, as it is wound upon the drum. The bar 18 and the holder 17 are fixed to the plate 8.

Mounted upon the post 7 and fixedly secured thereto is a supporting plate 22 provided on its upper face with a pair of bearings 23 in which is journaled a shaft 24 provided with a worm 25 and further carrying a ratchet 26. The plate 22 is slotted to allow of the positioning in operative relation with respect to the ratchet 26 of an oscillatory impulse member 27 which consists of a substantially circular-shaped body portion having inwardly extending teeth 28, 29 adapted to alternately engage with the ratchet 26 to intermittently rotate said ratchet whereby the shaft 24 and worm 25 is rotated. The impulse member 27 is pivoted through the medium of a stud 30 to a lug 31 depending from the lower face of the plate 22. The impulse member 27 is formed at its top with an upright arm 32 which is engaged by a fluid pressure reciprocatory actuated means whereby an oscillatory motion is imparted to the impulse member 27. The fluid pressure actuated means will be hereinafter referred to. Rotatably mounted upon the plate 22 is a drum 33 provided with a worm gear 34 adapted to mesh with the worm 25 whereby when the latter is rotated the drum 33 will be revolved. The drum 33 is formed with a cam groove 35 in which is adapted to travel a protuberance 36 carried by a shifting lever 38 which is pivoted at one end as at 39 in a bifurcated lug 40 carried by the upper face of the plate 22. The shifting lever 28 at its other end is articulated as at 41 to a shifting arm 42 which is pivotally connected to a stud 43 projecting from the marker carrier to be presently referred to.

The marker carrier which is adapted to be reciprocated through the medium of the shifting lever 38 and shifting arm 42 when the drum 33 is rotated comprises an outer and inner supporting plate 44, 45 respectively which are adapted to travel upon the vertically extending guide arm 46 formed with an elongated slot 47. The plates 44, 45 are mounted upon a tubular supporting member 48, the latter extending through the slot 47 and connected to the arm 46 through the medium of the plates 44, 45. Extending through the tubular member 48 is a marker head 49 in which is mounted the marker 50 which is adapted to record upon the tape 21. The plate 45 has one end of a spring 51 secured thereto, while the other end of the spring 51 bears against the head 49, whereby the marker 50 is retained in contact with the tape. The function of the spring 51 is to maintain the marker 50 at all times in engagement with the tape 21 so that during the rotation of the carrier 11 and the winding of the tape upon the drum, the marker will form a record upon the tape. The plate 44 has the lug 43 projecting therefrom and to which is attached the arm 42 and owing to such arrangement it is evident that when the shifting lever 38 is actuated through the medium of the rotation of the drum 33 and the walls of the groove 35, the marker carrier owing to the actuation of the arm 42 when the lever 38 is shifted will be caused to reciprocate, whereby the marker will be caused to travel transversely of the tape 21.

The fluid pressure actuated device for operating the impulse member consists of a tube 52 fixed in an enlargement 53 formed integral with the body portion 1 of the casing and which communicates with a nipple 54, the latter having attached thereto a flexible tube 55 communicating with an air compressor not shown and substantially of a form set forth in our co-pending application, Serial No. 403,348, filed November 22, 1907, the compressor being actuated from a moving part of the vehicle. Within the tube 52 is arranged a piston 56 having a bifurcated extension 57 to which is pivotally connected a link 58 which surrounds the arm 32, as clearly shown in Figs. 2 and 3. By such an arrangement it is evident that when the compressor is operated the impacting of the fluid upon the piston 56 will actuate the impulse member 27 in one direction and that when the partial vacuum is formed by the shifting of the piston of the air compressor in the opposite direction, as set forth in our co-pending application Serial No. 403,348, the piston 56 will be moved in the opposite direction carrying the impulse member therewith so as to position the latter to receive another impulse when the fluid impacts against the piston 56.

The record tape 21 which is fully shown in Fig. 10, is provided with divisions 58 formed by transverse and longitudinal lines to indicate fractions of the hour and fractions of a mile. By way of example, the fractions of the hour are to indicate fifteen minutes and the fractions of a mile are to indicate one-quarter. The tape is furthermore provided with hourly division lines as at 59 and also with conventional indications at one end as at 60. The strip transversely is shown by way of example as indicating two miles, each divided fractionally, the miles being divided by a heavy line as at 61. Fig. 10 also shows a record inscribed upon the tape through the medium of the marker, the record being indicated by the reference character 62. The tape as it leaves the holder 17 winds on the tape carrier 11, it being assumed that the latter is revolving.

The cover 2 is provided with a pair of diametrically and laterally extending lugs 59 adapted to be engaged by the protuberances 60 formed on the pivoted bail 61, whereby the cover 2 is fixedly secured to the body portion 1 when the bail 61 is elevated to the position shown in Fig. 9. The bail 61 is pivoted to the body portion as at 62 and is provided with an opening 63 which associates with an opening 64 formed in an outwardly extending lug 65 projecting from the cover 2. The openings 63 and 64 are adapted to receive a lock 66, whereby the bail 61 and lug 65 are connected together by the lock so that the cover 2 will be fixedly secured to the body portion 1.

As before stated, the actuation of the piston 56 is had through the medium of the motive fluid and impacting thereon and when an impulse is given to the piston 56 the member 27 engaging with the ratchet wheel 26 through the medium of the teeth 28 and 29 will rotate the shaft 24 which revolving the worm 25 and as the latter meshes with the gear 34 will rotate the drum 33, causing the actuation of the lever 38 and arm 42 which in turn will reciprocate the marker carrier and cause the marker to record on the tape 21 as the tape is being wound upon the carrier 11; it will be assumed however that the carrier is revolving through the medium of the clock train or motor mechanism.

What we claim is:—

1. A speed recorder comprising a rotatable record tape carrier, a reciprocatory marker carrier arranged in operative relation with respect to the tape upon the carrier and provided with a marker reciprocating in a plane parallel to the tape, means embodying a rotatable shaft provided with a ratchet for operating said marker carrier, an impulse member for the shaft surrounding said ratchet and provided with a pair of teeth adapted to alternately engage with the ratchet whereby the latter is intermittently rotated and the shaft revolved, means for oscillating said impulse member, and means independent of said shaft and ratchet for operating said tape carrier.

2. A speed recorder comprising a rotatable record tape carrier, a reciprocatory marker carrier arranged in operative relation with respect to the tape upon the carrier and provided with a marker reciprocating in a plane parallel to the tape, means embodying a rotatable shaft provided with a ratchet for operating said marker carrier, an impulse member for the shaft surrounding said ratchet and provided with a pair of teeth adapted to alternately engage with the ratchet whereby the latter is intermittently rotated and the shaft revolved, a fluid pressure operated reciprocatory piston provided with an extension connected with said impulse member for oscillating it, and means independent of said shaft and ratchet for operating said tape carrier.

3. A speed recorder comprising a rotatable record tape carrier, a slitted tape holder arranged in operative relation with respect to the carrier, a headed tape tensioning bar arranged in operative relation with respect to the carrier and to the tape holder, a reciprocatory marker carrier provided with a marker and arranged in operative relation with respect to the carrier, operating means for said marker carrier embodying a rotatable shaft and a ratchet upon the shaft, an oscillatory impulse member surrounding said ratchet and provided with a pair of teeth adapted to alternately engage the ratchet whereby the latter is intermittently rotated, and means engaging with said impulse member for oscillating it.

4. A speed recorder comprising a rotatable record tape carrier, a slitted tape holder arranged in operative relation with respect to the carrier, a headed tape tensioning bar arranged in operative relation with respect to the carrier and to the tape holder, a reciprocatory marker carrier provided with a marker and arranged in operative relation with respect to the carrier, operating means for said marker carrier embodying a rotatable shaft and a ratchet upon the shaft, an oscillatory impulse member surrounding said ratchet and provided with a pair of teeth adapted to alternately engage the ratchet whereby the latter is intermittently rotated, and a fluid pressure operated reciprocatory piston provided with an extension loosely engaging said impulse member for oscillating the latter when the piston is reciprocated.

5. A speed recorder comprising a rotatable record tape carrier, a reciprocatory marker carrier arranged in operative relation with respect to the tape upon the carrier and provided with a marker reciprocating in a plane parallel to the tape, means embodying a rotatable shaft provided with a ratchet for operating said marker carrier, an impulse member for the shaft surrounding said ratchet and provided with a pair of teeth adapted to alternately engage with the ratchet whereby the latter is intermittently rotated and the shaft revolved, means for oscillating said impulse member, said marker carrier provided with means for maintaining the marker in contact with the tape upon the tape carrier, and means independent of said shaft and ratchet for operating said tape carrier.

6. A speed recorder comprising a rotatable record tape carrier, a reciprocatory marker carrier arranged in operative relation with respect to the tape upon the carrier and provided with a marker reciprocating in a plane parallel to the tape, means embodying a rotatable shaft provided with a ratchet for operating said marker carrier, an impulse member for the shaft surrounding said ratchet and provided with a pair of teeth adapted to alternately engage with the ratchet whereby the latter is intermittently rotated and the shaft revolved, a fluid pressure operated reciprocatory piston provided with an extension connected with said impulse member for oscillating it, said marker carrier provided with means for maintaining the marker in contact with the tape upon the tape carrier, and means independent of said shaft and ratchet for operating said tape carrier.

7. A speed recorder comprising a rotatable record tape carrier, a slitted tape holder arranged in operative relation with respect to the carrier, a headed tape tensioning bar arranged in operative relation with respect to the carrier and to the tape holder, a reciprocatory marker carrier provided with a marker and arranged in operative relation with respect to the carrier, operating means for said marker carrier embodying a rotatable shaft and a ratchet upon the shaft, an oscillatory impulse member surrounding said ratchet and provided with a pair of teeth adapted to alternately engage the ratchet whereby the latter is intermittently rotated, and means engaging with said impulse member for oscillating it, said marker carrier provided with means for maintaining the marker in contact with the tape upon the tape carrier.

8. A speed recorder comprising a rotatable record tape carrier, a slitted tape holder arranged in operative relation with respect to the carrier, a headed tape tensioning bar arranged in operative relation with respect to the carrier and to the tape holder, a reciprocatory marker carrier provided with a marker and arranged in operative relation with respect to the carrier, operating means for said marker carrier embodying a rotatable shaft and a ratchet upon the shaft, an oscillatory impulse member surrounding said ratchet and provided with a pair of teeth adapted to alternately engage the ratchet whereby the latter is intermittently rotated, and a fluid pressure operated reciprocatory piston provided with an extension loosely engaging said impulse member for oscillating the latter when the piston is reciprocated, said marker carrier provided with means for maintaining the marker in contact with the tape upon the tape carrier.

9. A speed recorder comprising a rotatable record tape carrier, a reciprocatory marker carrier arranged in operative relation with respect to the tape upon the carrier and provided with a marker reciprocating in a plane parallel to the tape, means embodying a rotatable shaft provided with a ratchet for operating said marker carrier, an impulse member for the shaft surrounding said ratchet and provided with a pair of teeth adapted to alternately engage with the ratchet whereby the latter is intermittently rotated and the shaft revolved, means for oscillating said impulse member, and a vertically extending slotted guide arm for said marker carrier, and means independent of said shaft and ratchet for operating said tape carrier.

10. A speed recorder comprising a rotatable record tape carrier, a reciprocatory marker carrier arranged in operative relation with respect to the tape upon the carrier and provided with a marker reciprocating in a plane parallel to the tape, means embodying a rotatable shaft provided with a ratchet, an impulse member for the shaft surrounding said ratchet for operating said marker carrier and provided with a pair of teeth adapted to alternately engage with the ratchet whereby the latter is intermittently rotated and the shaft revolved, a fluid pressure operated reciprocatory piston provided with an extension connected with said impulse member for oscillating it, a vertically extending slotted guide arm for said marker carrier, and means independent of said shaft and ratchet for operating said tape carrier.

11. A speed recorder comprising a rotatable record tape carrier, a slitted tape holder arranged in operative relation with respect to the carrier, a headed tape tensioning bar arranged in operative relation with respect to the carrier and to the tape holder, a reciprocatory marker carrier provided with a marker and arranged in operative relation with respect to the carrier, operating means for said marker carrier embodying a rotatable shaft and a ratchet upon the shaft, an oscillatory impulse member surrounding said ratchet and provided with a pair of teeth adapted to alternately engage the ratchet whereby the latter is intermittently rotated, means engaging with said impulse member for oscillating it, and a vertically extending slotted guide arm for said marker carrier.

12. A speed recorder comprising a rotatable record tape carrier, a slitted tape holder arranged in operative relation with respect to the carrier, a headed tape tensioning bar arranged in operative relation with respect to the carrier and to the tape holder, a reciprocatory marker carrier provided with a marker and arranged in operative relation with respect to the carrier, operating means for said marker carrier embodying a rotatable shaft and a ratchet upon the shaft, an oscillatory impulse member surrounding said ratchet and provided with a pair of teeth adapted to alternately engage the ratchet whereby the latter is intermittently rotated, a fluid pressure operated reciprocatory piston provided with an extension loosely engaging said impulse member for oscillating the latter when the piston is reciprocated, and a vertically extending slotted guide arm for said marker carrier.

13. A speed recorder comprising a rotatable record tape carrier, a reciprocatory marker carrier arranged in operative relation with respect to the tape upon the carrier and provided with a marker reciprocating in a plane parallel to the tape, means embodying a rotatable shaft provided with a ratchet and operating means for said marker carrier, an impulse member for the shaft surrounding said ratchet and provided with a pair of teeth adapted to alternately engage with the ratchet whereby the latter is intermittently rotated and the shaft revolved, means for oscillating said impulse member, a vertically extending slotted guide arm for said marker carrier, said marker carrier provided with means for maintaining the marker in contact with the tape upon the tape carrier, and means independent of said shaft and ratchet for operating said tape carrier.

14. A speed recorder comprising a rotatable record tape carrier, a reciprocatory marker carrier arranged in operative relation with respect to the tape upon the carrier and provided with a marker reciprocating in a plane parallel to the tape, means embodying a rotatable shaft provided with a ratchet for operating said marker carrier, an impulse member for the shaft surrounding said ratchet and provided with a pair of teeth adapted to alternately engage with the ratchet whereby the latter is intermittently rotated and the shaft revolved, a fluid pressure operated reciprocatory piston provided with an extension connected with said impulse member for oscillating it, a vertically extending slotted guide arm for said marker carrier, said marker carrier provided with means for maintaining the marker in contact with the tape upon the tape carrier, and means independent of said shaft and ratchet for operating said tape carrier.

15. A speed recorder comprising a rotatable record tape carrier, a slitted tape holder arranged in operative relation with respect to the carrier, a headed tape tensioning bar arranged in operative relation with respect to the carrier and to the tape holder, a reciprocatory marker carrier provided with a marker and arranged in operative relation with respect to the carrier, operating means for said marker carrier embodying a rotatable shaft and a ratchet upon the shaft, an oscillatory impulse member surrounding said ratchet and provided with a pair of teeth adapted to alternately engage the ratchet whereby the latter is intermittently rotated, means engaging with said impulse member for oscillating it, and a vertically extending slotted guide arm for said marker carrier, said marker carrier provided with means for maintaining the marker in contact with the tape upon the tape carrier.

16. A speed recorder comprising a rotatable record tape carrier, a slitted tape holder arranged in operative relation with respect to the carrier, a headed tape tensioning bar arranged in operative relation with respect to the carrier and to the tape holder, a reciprocatory marker carrier provided with a marker and arranged in operative relation with respect to the carrier, operating means for said marker carrier embodying a rotatable shaft and a ratchet upon the shaft, an oscillatory impulse member surrounding said ratchet and provided with a pair of teeth adapted to alternately engage the ratchet whereby the latter is intermittently rotated, a fluid pressure operated reciprocatory piston provided with an extension loosely engaging said impulse member for oscillating the latter when the piston is reciprocated, and a vertically extending slotted guide arm for said marker carrier, said marker carrier provided with means for maintaining the marker in contact with the tape upon the tape carrier.

17. A speed recorder comprising a rotatable record tape carrier, a vertically extending slotted guide arm arranged in operative relation with respect thereto, a reciprocatory marker carrier mounted upon the guide arm and provided with a marker, a rotatable drum provided with a worm gear and a cam groove, a pivoted lever provided with a protuberance extending in said groove and adapted to be actuated when the drum is rotated, a shifting arm connected to the lever and to the marker carrier for reciprocating the latter when the lever is actuated, a radial worm shaft engaging with said worm gear for rotating said drum, a ratchet upon said worm shaft, an oscillatory impulse member surrounding said ratchet and provided with a pair of teeth adapted to intermittently engage with the ratchet for driving the latter when said member is oscillated, and means engaging with said member for oscillating it.

18. A speed recorder comprising a rotatable record tape carrier, a vertically extending slotted guide arm arranged in operative relation with respect thereto, a reciprocatory marker carrier mounted upon the guide arm and provided with a marker, a rotatable drum provided with a worm gear and a cam groove, a pivoted lever provided with a protuberance extending in said groove and adapted to be actuated when the drum is rotated, a shifting arm connected to the lever and to the marker carrier for reciprocating the latter when the lever is actuated, a rotatable worm shaft engaging with said worm gear for rotating said drum, a ratchet upon said worm shaft, an oscillatory impulse member surrounding said ratchet and provided with a pair of teeth adapted to intermittently engage with the ratchet for driving the latter when said member is oscillated, and a fluid pressure operated reciprocatory piston provided with an extension loosely engaging with said impulse member for oscillating the latter when the piston is reciprocated.

19. A speed recorder comprising a rotatable record tape carrier, a vertically extending slotted guide arm arranged in operative relation with respect thereto, a reciprocatory marker carrier mounted upon the guide arm and provided with a marker, a rotatable drum provided with a worm gear and a cam groove, a pivoted lever provided with a protuberance extending in said groove and adapted to be actuated when the drum is rotated, a shifting arm connected to the lever and to the marker carrier for reciprocating the latter when the lever is actuated, a rotatable worm shaft engaging with said worm gear for rotating said drum, a ratchet upon said worm shaft, an oscillatory impulse member surrounding said ratchet and provided with a pair of teeth adapted to intermittently engage with the ratchet for driving the latter when said member is oscillated, means engaging with said member for oscillating it, a slitted tape holder arranged in operative relation with respect to said drum, and a headed tape tensioning bar arranged in operative relation with respect to the tape carrier and tape holder.

20. A speed recorder comprising a rotatable record tape carrier, a vertically extending slotted guide arm arranged in operative relation with respect thereto, a reciprocatory marker carrier mounted upon the guide arm and provided with a marker, a rotatable drum provided with a worm gear and a cam groove, a pivoted lever provided with a protuberance extending in said groove and adapted to be actuated when the drum is rotated, a shifting arm connected to the lever and to the marker carrier for reciprocating the latter when the lever is actuated, a rotatable worm shaft engaging with said worm gear for rotating said drum, a ratchet upon said worm shaft, an oscillatory impulse member surrounding said ratchet and provided with a pair of teeth adapted to intermittently engage with the ratchet for driving the latter when said member is oscillated, a fluid pressure operated reciprocatory piston provided with an extension loosely engaging with said impulse member for oscillating the latter when the piston is reciprocated, a slitted tape holder arranged in operative relation with respect to said drum, and a headed tape tensioning bar arranged in operative relation with respect to the tape carrier and tape holder.

21. A speed recorder comprising a rotatable tape carrier, a reciprocatory marker arranged in operative relation with respect to the tape upon the carrier, means for reciprocating said marker, a vertically extending tape holder arranged in operative relation with respect to the carrier and provided with a slot through which passes the tape, and a headed tape tensioning bar arranged in operative relation with respect to the carrier and to the holder.

22. A speed recorder comprising a rotatable tape carrier, a reciprocatory marker arranged in operative relation with respect to the tape upon the carrier, means for reciprocating said marker, a vertically extending tape holder arranged in operative relation with respect to the carrier and provided with a slot through which passes the tape, a headed tape tensioning bar arranged in operative relation with respect to the carrier and to the holder, a supporting means for said element and inclosing means for the element, and means for detachably connecting the inclosing means and the supporting means.

23. A speed recorder comprising a rotatable record tape carrier, a reciprocating marker carrier arranged in operative relation with respect to the tape upon the tape carrier and provided with a marker reciprocating in a plane parallel to the tape, an arm for reciprocating said marker carrier, a lever for reciprocating said arm, means embodying a rotatable shaft provided with a ratchet for operating said lever, an impulse member for the shaft, means for operating said impulse member, and means independent of said shaft and ratchet for operating said tape carrier.

24. A speed recorder comprising a rotatable record tape carrier adapted to have a record tape wind thereon during the revolution of the carrier, a reciprocatory marker carrier arranged in operative relation with respect to the tape when winding upon the tape carrier and provided with a marker reciprocating in a plane parallel to the tape, an arm for reciprocating said marker carrier, a lever for reciprocating said arm, means embodying a rotatable shaft provided with a ratchet for operating said lever, an impulse member for said ratchet whereby the shaft is rotated, a fluid pressure actuated means for operating said impulse member, and means independent of said shaft and ratchet for operating said tape carrier.

25. A speed recorder comprising a rotatable record tape carrier adapted to wind the record tape thereon during the revolution thereof, a reciprocatory marker arranged in operative relation with respect to the tape upon the tape carrier and provided with a marker reciprocating in a plane parallel to the tape, an arm for reciprocating said marker carrier, a lever for reciprocating said arm, operating means for said lever, actuating means for said operating means, and means independent of the operating means for the lever for revolving said record tape carrier.

26. A speed recorder comprising a rotatable record tape carrier adapted to have a record tape wind thereon during the revolution thereof, a reciprocating marker carrier arranged in operative relation with respect to the tape upon the tape carrier and provided with a marker reciprocating in a plane parallel to the tape and engaging the tape, an arm for reciprocating said marker carrier, a lever for reciprocating said arm, operating means for said lever, a fluid pressure operated means for actuating the operating means for the marker carrier, and means independent of said fluid pressure actuated means and the operating means for the lever for revolving the said record tape carrier.

27. A speed recorder comprising a rotatable record tape carrier, a slitted tape holder arranged in operative relation with respect to the carrier, a tape tensioning member arranged in operative relation with respect to the carrier and to the tape holder, a reciprocating marker carrier arranged in operative relation with respect to the tape upon the carrier and provided with a marker reciprocating in a plane parallel to the tape, an arm for reciprocating said marker carrier, a lever for reciprocating said arm, operating means for said lever, actuating means for said operating means, and means independent of the operating means for the lever for revolving said record tape carrier.

28. A speed recorder comprising a rotatable record tape carrier, a slitted tape holder arranged in operative relation with respect to the carrier, a tape tensioning member arranged in operative relation with respect to the carrier and to the tape holder, a reciprocatory marker reciprocating in a plane parallel to the tape, an arm for reciprocating said marker carrier, a lever for reciprocating said arm, means for oscillating said lever, and means independent of the operating means for the lever for revolving said record tape carrier.

29. A speed recorder comprising a rotatable record tape carrier, a reciprocatory marker arranged in operative relation with respect to the tape upon the carrier and operating in a plane parallel to the tape, a reciprocatory means for operating the marker, an oscillatory lever for operating said reciprocatory means, a fluid pressure operated mechanism for operating said lever, and means independent of said fluid pressure actuated mechanism for revolving said record tape carrier.

30. A speed recorder comprising a rotatable record tape carrier revolving on a vertical axis, a rotatable element revolving on a vertical axis, a reciprocatory marker arranged in operative relation with respect to the tape upon the carrier and operating in a plane parallel to the tape, a lever oscillated by said element, an arm reciprocated by said lever, means operated by said arm and connected to the marker for reciprocating it, a fluid pressure actuated mechanism for rotating said element, and means independent of said element and said fluid pressure mechanism for revolving said record tape carrier.

31. A speed recorder comprising a rotatable record tape carrier, a rotatable element independent of said carrier, operating means for said element, an oscillatory member engaging with said operating means for actuating it, a fluid pressure actuated impulse member extending at an inclination and engaging with said oscillatory member for operating it, a reciprocatory marker arranged in operative relation with respect to the tape upon the carrier and operating in a plane parallel to the tape, an operative connection between said rotatable element and said marker for reciprocating the latter, said operative connection comprising an oscillatory lever and a reciprocating arm, and means independent of said element, its operating means, and said oscillatory and impulse members for revolving said record tape carrier.

In testimony whereof we have hereunto set our hands in presence of two subscribing witnesses.

CASCIOUS H. DE LA MONTE.
EDWARD A. HENKLE.

Witnesses:
L. FRESCOLN,
WALTER H. JACKSON.